No. 121,549.  Patented Dec. 5, 1871.
HADWEN L PURDIE
Locking Washer.
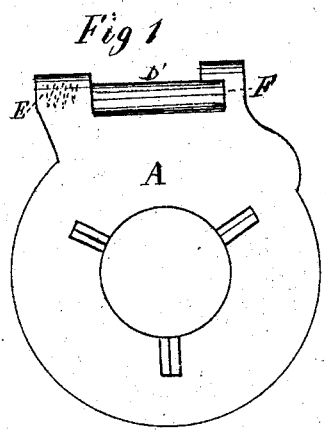
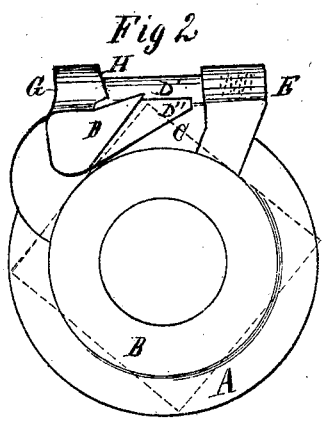
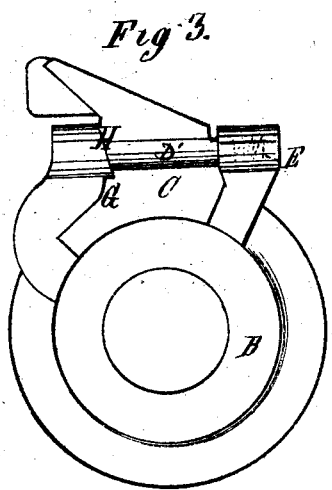
Witnesses.
Inventor
Hadwen L Purdie
Daniel Breed
Atty.

UNITED STATES PATENT OFFICE.

HADWEN L. PURDIE, DECEASED, OF BUFFALO, NEW YORK, (JOHN PURDIE, ADMINISTRATOR,)

IMPROVEMENT IN NUT-LOCKING DEVICES.

Specification forming part of Letters Patent No. 121,549, dated December 5, 1871.

*To all whom it may concern:*

Be it known that I, HADWEN L. PURDIE, of Buffalo, in the county of Erie and State of New York, have invented certain Improvements in Locking-Washers for Nuts, of which the following is a specification:

My invention consists, First, in a washer having a dog hinged to one side thereof, in combination with a spring and catch for locking the dog in place by the side of the nut. Second, in a washer provided with a pivoted dog, which is locked in place by being in part overlapped or caught by the nut when turned slightly backward.

In the accompanying drawing, Figure 1 is a view of the under side of my improved locking-washer for nuts. Fig. 2 is a face view of the same, with the dog or fall in place for locking the nut. Fig. 3 is the face view, with pivoted dog or fall turned open so the nut may move freely.

The washer may be cast in the form seen at H, Fig. 1, having a hub, B, Fig. 2, projecting from the face side of the washer, or a recess, C, for the reception of that part of the dog or fall $D''$ which lies beneath the plane of the face of the washer when the dog is turned into place, as seen in Fig. 2. The projecting or main part of the dog, which acts as a lock for the nut, is seen at D, and it has a pivot, $D'$, and a fin or thin part, $D''$, which falls into the recess C, and is overlapped by the corner of the nut when the nut is turned slightly backward, as shown in dotted lines in Fig. 2. Thus the portion D of the dog locks the nut, while the corner of the nut in turn locks the dog. The dog is also provided with a small notch, which slides under the catch G of the hinge or socket, and thus it is double-locked. The recess C in a thin washer may be cut entirely through the washer-plate. A coiled spring, E, (dotted lines,) is placed in one of these sockets, and, the pivot being pressed home upon the spring, the opposite end is passed into its socket through a notch, F, Fig. 1. The sockets of the pivots may be cast with a notch on one side to allow the pivot to be slipped into place. The lips of this notch should be long, and, being made of malleable iron, they may be bent down or hooked over the socket to close upon the pivot. After the nut is screwed home upon the bolt the dog or fall D is turned to its place, as seen in Fig. 2. Then the spring pushes the dog or fall laterally, so as to lock under the catch G, Figs. 2 and 3. The nut is also turned slightly backward, so that one corner of the nut catches over the fin or web of the fall, as seen in dotted lines, Fig. 2. Thus the dog or fall has a double-lock—one under the catch G and the other under the nut.

It will be seen that the dog or fall in turning is pushed by the spring against an oblique or cam-border of the socket, as seen at H, Figs. 2 and 3.

In order to open the dog or fall, or to loosen the nut when once locked, it is necessary, first, to turn the nut forward so as to clear the fin of the dog or fall, which must then be pushed laterally so as to compress the coiled spring and release the dog or fall from the catch H.

I do not confine my invention to the above form of washer and dog or fall, both of which may be made in any suitable shape, according to the purpose for which they are designed.

Having thus described my invention, what I claim is—

1. A washer having a dog hinged to the side thereof, in combination with a spring and catch for locking the dog in place by the side of the nut, substantially as set forth.

2. A washer provided with a pivoted dog having the parts D and $D''$, substantially as and for the purposes set forth.

HADWEN L. PURDIE.

Witnesses:
DANIEL BREED,
JOHN PURDIE.